United States Patent [19]

Monzini

[11] 4,308,907

[45] * Jan. 5, 1982

[54] VEHICLE TIRE AND WHEEL CONSTRUCTION WITH SELECTIVE DEFORMABILITY

[76] Inventor: Renato Monzini, 16, Via Conte Verde, Milan, Italy, 1-20158

[ * ] Notice: The portion of the term of this patent subsequent to Sep. 25, 1996, has been disclaimed.

[21] Appl. No.: 39,385

[22] Filed: May 15, 1979

Related U.S. Application Data

[63] Continuation-in-part of Ser. No. 807,660, Jun. 17, 1977, Pat. No. 4,168,732.

[30] Foreign Application Priority Data

Feb. 12, 1979 [IT] Italy ............................. 20114 A/79

[51] Int. Cl.³ ................... B60C 13/00; B60C 15/00
[52] U.S. Cl. ................... 152/353 R; 152/209 WT; 152/353 G; 152/361 R; 152/379.5; 152/398; 152/405
[58] Field of Search .......... 152/353 R, 353 C, 353 G, 152/352 R, 352 A, 361 R, 381.1, 386, 209 WT, 379.2 D, 398, 362 R, 354 R, 379.1, 396, 397, 401, 409, 379.5, 405

[56] References Cited

U.S. PATENT DOCUMENTS

| | | | |
|---|---|---|---|
| 1,337,660 | 4/1920 | Killen | 152/362 R X |
| 1,842,219 | 1/1932 | Trautman | 152/352 R X |
| 1,885,901 | 11/1932 | Ennis | 152/379.2 D |
| 3,631,913 | 1/1972 | Boileau | 152/354 X |
| 3,638,704 | 2/1972 | Boileau | 152/353 |
| 4,059,138 | 11/1977 | Mirtain | 152/353 R X |
| 4,168,732 | 9/1979 | Monzini | 152/209 WT X |

FOREIGN PATENT DOCUMENTS 1059542 3/1954 France ..................... 152/209 WT

*Primary Examiner*—William A. Powell
*Assistant Examiner*—Thomas Bokan
*Attorney, Agent, or Firm*—McGlew and Tuttle

[57] ABSTRACT

A pneumatic tire and wheel construction having a tire annularly disposed around the wheel and engaged therewith to form an air space for pressurized air. The tire is formed by a pair of undeformable side wall portions each having inner edges including beads of the tire and engaged with the wheel, a deformable side wall portion connected to each outer edge of the undeformable side wall portions, a restricted pliable wall portion connected each to outer edges of the deformable side wall portions and a belt portion connected between the outer edges of the restricted pliable wall portions. A tread carrying portion is connected to and around the outer surface of the belt portion and includes side projections extending axially outwardly of the belt portion with a cavity defined between each of the side projections and each of the restricted pliable wall portions respectively. Lateral restraining members are connected to the wheel and extend radially outwardly and over the undeformable side wall portions of the tires to restrict deformation thereof.

10 Claims, 7 Drawing Figures

U.S. Patent Jan. 5, 1982 Sheet 1 of 3 4,308,907
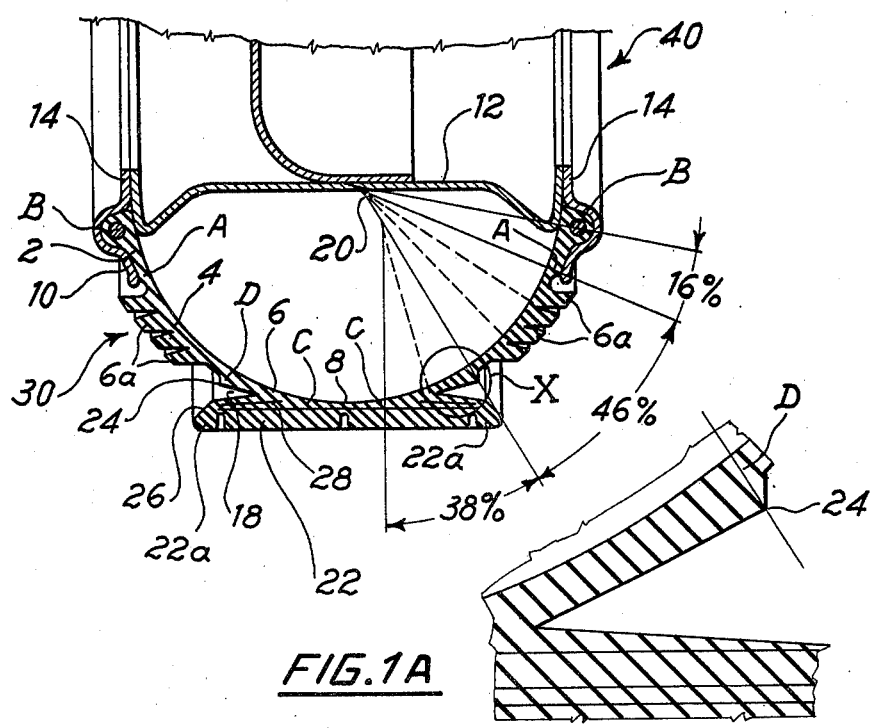
FIG. 1
FIG. 1A
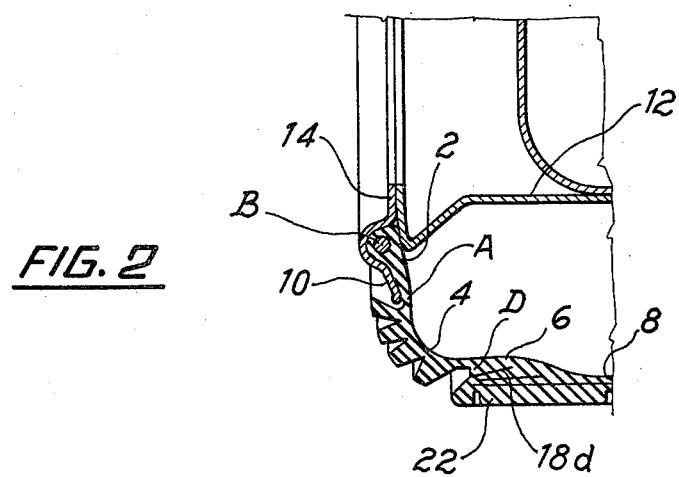
FIG. 2

VEHICLE TIRE AND WHEEL CONSTRUCTION WITH SELECTIVE DEFORMABILITY

CROSS-REFERENCE TO RELATED APPLICATIONS

The present application is a continuation-in-part of the inventor's previous application Ser. No. 807,660 entitled "Vehicle Tire and Wheel Construction with Controlled Deformation" filed June 17, 1977 now U.S. Pat. No. 4,168,732. All of the subject matter of this patent is incorporated by reference here.

BACKGROUND OF THE INVENTION

1. Field of the Invention

The present invention relates in general to wheel and pneumatic tire constructions and, in particular, to a new and useful wheel and tire construction which includes a selected and restricted deformation portion.

2. Description of the Prior Art

All tires of the type conventionally used on motor vehicles have characteristic rolling resistances which cause an additional dissipation of work energy to that energy needed to propel the weight of the vehicle. The rolling resistance of tires are generally related to the amount of deformation experienced by the tire as it rolls, the structure and rigidity of the tire material itself and other factors which have been studied extensively by this applicant and others. Examples of this work include U.S. Pat. No. 3,830,272 of Aug. 20, 1974 this applicant and U.S. patent application Ser. No. 749,664 filed Dec. 3, 1976, and now abandoned, also by this applicant. These phenomenon are more fully described and disclosed in the parent to this application identified above.

SUMMARY OF THE INVENTION

The present invention comprises an improvement in tire design which utilizes a tire carcass comprising a pair of annular undeformable side wall portions which have inner edges terminating in bead formations and engaged with a rigid metal wheel on which it is mounted. Deformable side wall portions are connected to outer edges of the pair of undeformable side wall portions and extend radially outwardly therefrom. The outer edges of these deformable side wall portions are in turn connected to a pair of restricted pliable wall portions which are connected together by a central belt portion. The thus identified series of portions form the curved tire carcass which defines a cavity for retaining pressurized air. The cavity may be hermetically sealed either by a hermetic engagement of the bead portions to the wheel in known tubeless tire design or may include a tube of conventional design.

Lateral restraining members extend radially outwardly from the wheel, over and in abutment with the undeformable portion of the tire carcass to restrain this portion and prevent it from deforming when a load is applied to the tire. An annular tread carrying portion is connected to the outer peripheral surface of the belt portion and includes side projections extending axially of the belt portion. A pair of cavities or annular grooves are thus defined between the side projections of the tread carrying portion and each of the restricted pliable wall portions.

When a load is placed on the tire, for instance as it rolls along the ground, the deformable side wall portion of the tire deforms absorbing the weight of the vehicle on which the tire is mounted. In one embodiment of the invention, the restricted pliable wall portion also deforms until it abuts on its outer peripheral surface the inner surface of the side projections. Some of the weight of the vehicle is thus supported on the tread carrying portion through the restricted pliable wall portion and some of the weight of the tire is supported through the belt portion which is also connected to the tread carrying portion of the tire.

In another embodiment of the invention a deformation resistant material fills the annular grooves or cavities to further restrict the deformation of the restricted pliable wall portion but at the same time permitting the free deformation of the deformable side wall portions.

The tire is preferably of the radial belted type and made of known suitable elastomeric material. When unloaded, the tire takes the form of a catenary curve with the undeformable, the deformable, and the restricted pliable wall portions each disposed in a selected proportion of the total arc distance between the bead next to the wheel and the belt portion of the tire. In a preferred construction of the tire it has been found advantageous to proportion the arc segments occupied by the various portions so that the undeflectable side wall portion occupies from 10 to 25% of the arc, the deformable side wall portion occupies 30 to 75% of the arc with the remainder of the arc occupied by the restricted pliable wall portion. It has been found even more preferable to restrict the deformable side wall portion to between 40 and 60% of the total arc.

Accordingly an object of the present invention is to provide a wheel and tire construction with the tire including undeformable side wall portions restricted by side or lateral restrainers extending from the wheel and overlapping the undeformable side wall portions with the tire including deformable side wall portions connected to the undeformable side wall portions which are believed to deflect in accordance with the load applied to the tire.

Another object of the present invention is to provide a pneumatic tire and wheel construction having a tire annularly disposed around the wheel and engaged therewith to form an air space for pressurized air comprising, a pair of undeformable side wall portions of the tire having inner edges engaged with the wheel, a deformable side wall portion of the tire connected to outer edges of each of the undeformable side wall portions, a restricted pliable wall portion of the tire connected to outer edges of each of the deformable side wall portions, a belt portion of the tire connected between the outer edges of the restricted pliable wall portions, a tread carrying portion of the tire connected to the outer surface of the belt portion having side projections extending axially outwardly of the belt portion with a cavity defined between each of the side projections and each of the restricted pliable wall portions respectively, and a lateral restraining member connected to the wheel and extending over an adjacent each of the undeformable side wall portions for restraining the deformation thereof.

A further object of the present invention is to provide a tire and wheel construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a sectional view of the tire and wheel construction taken along a plane containing the wheel axis showing the tire in its unloaded state and subjected only to the internal pneumatic inflation pressure;

FIG. 1a is an enlarged cross-sectional view taken in the area X of FIG. 1 showing the annular cavity between the tread carrying portion of the tire and the restricted pliable side wall portion of the tire;

FIG. 2 is a fractional view similar to that of FIG. 1 showing the tire in its loaded condition with the tire shown supporting the weight of a vehicle on substantially level ground;

DESCRIPTION OF THE PREFERRED EMBODIMENTS

With reference to the drawings, the invention embodied therein, in FIG. 1 comprises a tire or tire carcass generally designated 30 which is mounted on a wheel generally designated 40. The tire is made of conventional elastomeric material and supported internally by fibrous reinforcements disposed in various plies in known fashion. For simplicity of illustration these reinforcement plies have been omitted from the drawings. For the purposes of the invention, the tire 30 is assumed to be of the "radial" type and also of the "belted" type which terms are known in the art to describe that particular arrangement of tire reinforcement. For a fuller description of these reinforcements reference should be had to the parent of this application disclosed above. The tire 30 is mounted on the wheel 40 which is of rigid metallic structure and construction.

The tire defines a cavity with the wheel for accepting pressurized air and may be of the known tubeless variety which requires the hermetic sealing of the tire inner edges to the wheel or maybe of the air tube type which is known per se.

Figure 3:
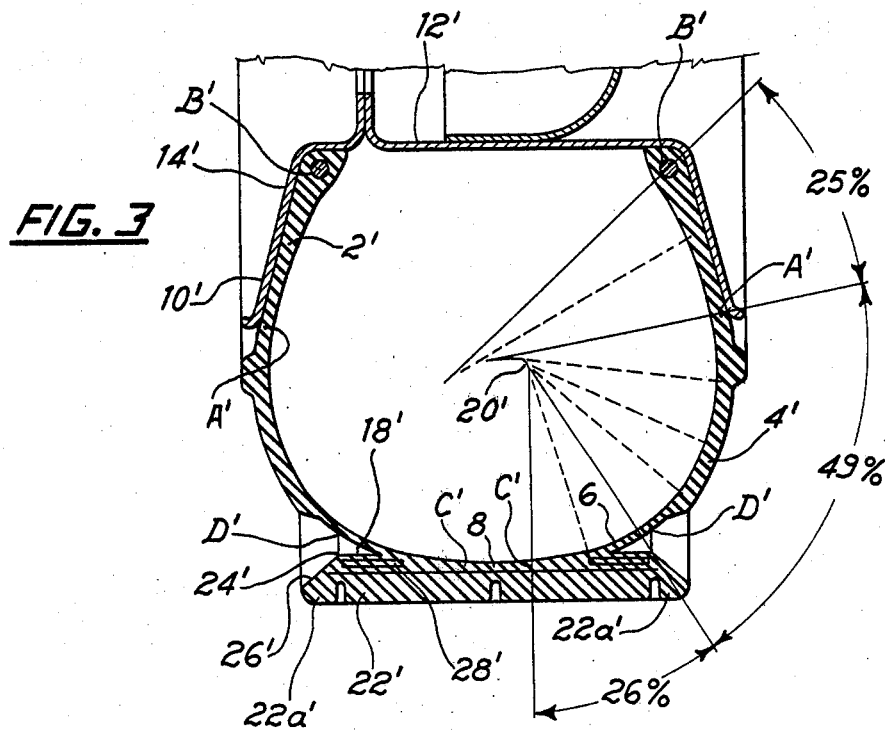
FIG. 3 is a view similar to FIG. 1 of another embodiment of the invention.
Figure 4:
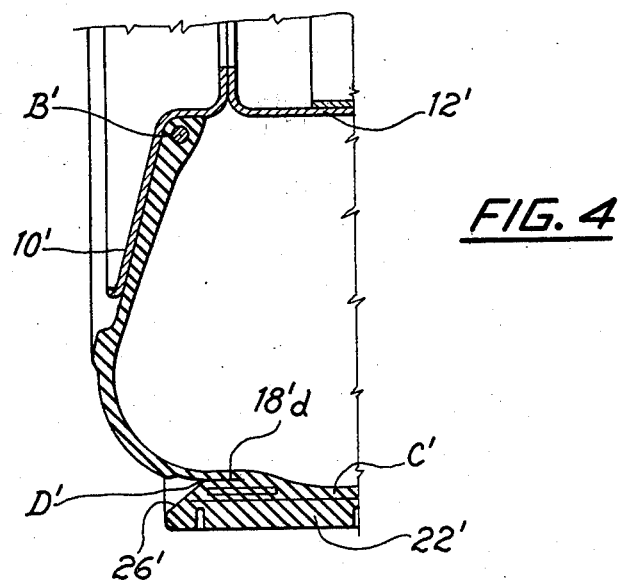
FIG. 4 is a view similar to FIG. 2 of the embodiment shown in FIG. 3.
Figure 5:
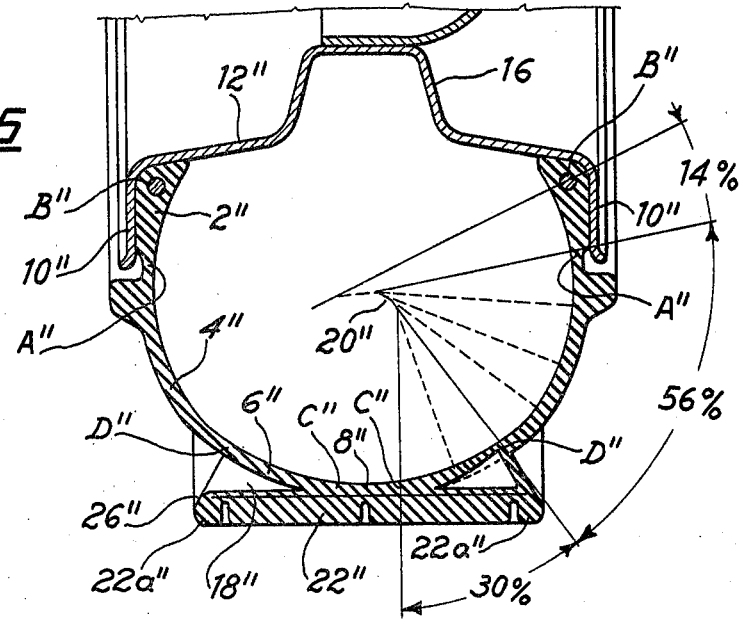
FIG. 5 is a view similar to FIG. 1 of a still further embodiment of the invention.
Figure 6:
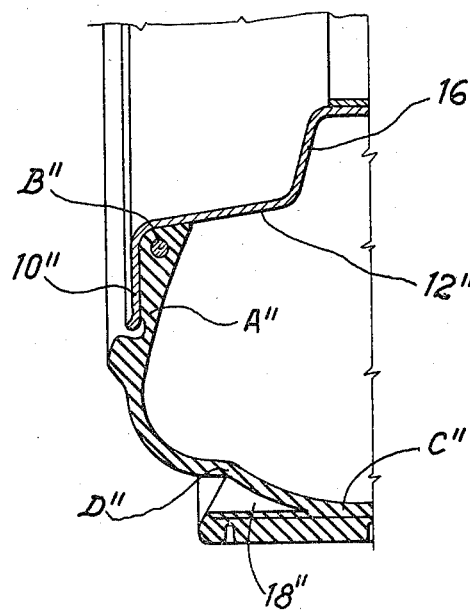
FIG. 6 is a view similar to FIG. 2 of the embodiment shown in FIG. 5.

In the drawings, like elements of the embodiment shown in FIGS. 1 and 2 are numbered with like numerals in the embodiment shown in FIGS. 3 and 4 and that shown in FIGS. 5 and 6 with a prime a double prime respectively.

An essential characteristic of the invention is that the rigid metallic structure of the wheel include lateral "restrainers" or restraining members 10, which comply with the configuration of the tire side walls or flanks as manufactured, starting from the respective beads and extending radially outwardly of the wheel. Restraining members 10 prevent any flank deformation in an outward direction, aside from that foreseen in the factory design. due either to the effect of the pneumatic pressure, and to the deformations resulting from an overload due to ground irregularities. Members 10' of FIG. 3 and 10" of FIG. 5 work in analogous ways.

In other words, when the pneumatic tire is used, all portions of its flanks or side walls complying with the restrainers are undeformable.

In the drawings some characteristic points are indicated by capital letters which extend over the whole tire periphery. These points and the zones defined therebetween require a very accurate determination and comments, as follows:

Points A define the outer limit of the contact zone between the tire flanks and the respective adjacent restrainers. This area 2, 2' and 2" for FIGS. 1, 3 and 5 are the undeformable side wall portion of the tire.

Points B and respectively B', B", define the inner limit of the tire flanks and actually coincide with non-extensible "wires" which are incorporated into the bead of the tire elastomeric structure. They coincide also with the fixing points of the plies and in particular of the chords defining in close radial planes of a typical radial tire structure. It is to be understood that the term "radial" applies to all planes containing the wheel axis.

The arcs A-D, A'-D' and A"-D" define deformable tire side wall portions 4, 4' and 4" respectively which deform on normal loading of the tire (see FIGS. 2, 4 and 6).

The points C as well as C' and C" of the various figures coincide with the area of "welding" of the elastomeric structure with the stiffened part of the belt and tread. This belt portion 8, 8' and 8" is connected at its outer surface to tread portions 22, 22' and 22".

The points D as well as D' and D", are particularly interesting in that they define, as will be described in more detail later, a position in which the deformability of this tire is controlled and from which the carcass begins to oppose the tread under load. In the embodiment of FIGS. 5 and 6 the arc D"-C" remains practically unchanged. Areas 6, 6' and 6" between these points are the restricted but pliable wall portions of the tires.

As can be seen from the accompanying figures, these points are repeated in conditions of specular symmetry with respect to the general symmetry plane of the tire, perpendicular to the wheel axis.

The rigid structure of the rim and means connecting the same to the wheel hub do not form part of the invention and may be of any kind, depending upon constructional factors.

By way of example, FIGS. 1 and 2 show a wheel rim in three pieces. The lateral pieces 14, integral with the restrainers 10, can be connected in any movable manner, for example by means of tie rods, stud bolts, screws and nuts or the like, to a central piece 12 adapted to complete the cavity wherein the pneumatic pressure is applied, with or without an air tube.

FIGS. 3 and 4 show a wheel rim in two pieces, 12' and 14', which are connected in any suitable manner allowing the securing and removal of the tired wheel.

FIGS. 5 and 6 show a single-piece wheel rim which obviously comprises parts 12" so extending to form the restrainers 10", as well as a deep channel 16" allowing tire mounting or removing operations.

At the portions 6 and 6' in arcs C-D and C'-D', between the projections 22a, 22a' of the tread portions 22, 22', and outside of arcs C-C and respectively C'-C', cavities 18 and respectively 18' extending through the whole outline of the wheel are provided for, said cavities forming an apex toward the inside (FIG. 1A), while the corresponding cavities 18" in the example of FIGS. 5 and 6 are at least in part filled by stiffening means or material causing different tire deformations, as shown when comparing the embodiments of FIGS. 2, 4 to that of FIG. 6.

With exclusion of the embodiment of FIGS. 5 and 6, the perfect adjacency of the convergent faces of the apex-shaped cavities 18, 18' is completed by apexed summits 24 and respectively 24' belonging to the total deformable part of the arc A-C for FIGS. 1 and 3, and respectively to the projecting part 22a, 22a' of the tread. These summits 24, 24' are very important, as they permit a definition of points D and D' between the deformable side wall portion and the restricted deformation or pliable wall portion. In fact, points D and D' lie on the particular radius of the (catenary) curve, as formed by the tire side wall, going through summit 24 or 24" when the tire is loaded (FIGS. 2 and 4). In the embodiment of FIGS. 1 and 2, as summit 24 belongs to the tire side wall, the point D always lies on the above defined radius, in all tire loading conditions, while in the embodiment of FIGS. 3 and 4, as summit 24" belongs to the projecting part of the tread, the above alignment condition of summit 24' and point D' on a curve radius is fulfilled only when the tire is loaded (FIG. 4), while when the tire is unloaded the point D' is shifted from the radius by an amount that depends on the opening angle and depth of cavity 18'.

In addition, in all embodiments, the projecting part of the tread portions show a flaring 26, 26' and 26" and this projecting part may comprise a perimetrical belting 28 and 28'.

Such interesting characteristic can be seen in FIGS. 1, 2 and 3, 4 wherein the projecting part 22a and 22a' respectively, have a belting or reinforcement 28 28' practically made (and successfully made in experimental samples) with strips of rubber cloth and steel chords or wires, for example of a diameter of 1.5 mm, in a direction parallel to the cylinder defined by the tread portions.

These reinforcements have a threefold task which are the following:

Reduction of the tread flattening out (characteristically enlarged beyond the respective belt parts C-C, C'-C', C"-C") (in the embodiment of FIGS. 5 and 6 the stiffening effect is obtained by the stiffening means filling spaces 18" and adapted to directly transfer the pneumatic pressure to the tread projections.

Reduction of the deformation work due to a decrease of the whole tread flattening.

Reinforcement of the belt which actually tends to show a "double T" section.

In other words, when considering the structure of the wheel and tire with regard to its elastomeric mass, it can be seen that arcs A-B, A'-B', A"-B" are sustained by lateral restrainers 10, 10', 10". Arcs A-C and respectively A'-C' are deformed when a load is applied to the tire, with deformations assuming a flex outline at the areas adjacent to the respective points C and C'. In the embodiment of FIGS. 5 and 6, the flex point coincides with point D" due to the inside stiffening of space 18". The stiffening means in 18" may be of the type shown in the parent patent at FIGS. 9, 10, 11 and 12 thereof.

During the progressive deformation of the tire when loaded (this deformation appears and disappears at each peripheral point during each rotation of the pneumatic tire on the ground), the initial deformation phase coincides with the total closure of cavities 18 and 18' which closure does not take place in the embodiment of FIGS. 5 and 6 wherein this cavity is filled with stiffenings adapted to withstand a combined bending and compressive stress). This deformation is followed by that of parts A-D, A'-D', A"-D". It is to be noted that the preferred embodiment of FIGS. 1 and 2 comprises arcs A-D having side wall projections 6a with alternate perimetrical cavities always having apexed ends. The behavior of these projections is reversed during flattening as clearly shown in FIG. 2. These cavities thus open as cavity 18 closes.

The embodiment of FIGS. 3 and 4 shows a thinned tire side near point D' to promote the initial flattening or closing of cavity 18'.

The improved pneumatic tire according to this invention always comprises in deformable parts A-B, A'-B', A"-B" (2, 2' and 2") wherein the elastomeric structure of the tire sides under pneumatic pressure and under any load condition is not deformable as being "sustained" by restrainers 10, 10', 10".

As well known by those skilled in the art, the side walls of an inflated but not loaded tire take the form of a so-called natural or catenary curve which is a variable radius curve. In the drawings, particular radii of such a curve had been indicated, together with the locus of radius centers 20, 20', 20". On said catenary curve and by said particular radii, the above stated critical points B, A, D and C according to this invention have been identified, together with a percentage indication of the preferred size of arcs as defined by said points.

The values or respective relative sizes of arcs as defined by the radii passing through A, A' and A" and respectively B, B', B", C, C', C" and D, D', D" have a merely indicative measure. These values are accompanied by the conventional "percentage" symbol and differ from each other when relating to the angles or respectively to the arcs, as these latter are formed by catenary curves with variable radii. The percentages show parts of the total arc B-C, which is occupied by the various tire portions.

Critical points are those indicated by A, A', A" (defining the maximum or outer limit of the restrainers) and by D, D', D", establishing the zones wherein said elastomeric structure is free to be deformed under the most different equilibrium conditions between pneumatic pressure and flattening effect.

These percentage values, that can be considered both as length and angle percentages, are therefore quite important and interesting when considering the central or deformable tire flank portion that may undergo an almost indefinite deformation.

It is important that this central flank portion represents a percentage between 30% and 75% of the whole tire flank in order to attain the purposes of this invention.

It is preferable that this deformable or "central" flank part be between 40% and 60% of the total arc defined.

Obviously, what above relates to pneumatic tires and wheels as a whole and/or to single details thereof in any combination. This applies in particular to the circular apexed recesses 18, 18'. Actually, these recesses can be in the form of small slots of the order of 1° or of well opened cuts of the order of 45°, the choice depending upon the "readiness" of their closure under the initial flattening effect, the character of flex formed by the elastomeric material and so on. All these modifications must be considered as coming within the spirit and scope of this invention as defined in any one or more of the following claims.

While specific embodiments of the invention have been shown and described in detail to illustrate the application of the principles of the invention, it will be understood that the invention may be embodied otherwise without departing from such principles.

What is claimed is:

1. An inflatable pneumatic tire and wheel construction for supporting a service load on a load area of a tire, having a tire annularly disposed around the wheel and engaged therewith to form an air space for pressurized air comprising:

a pair of undeformable side wall portions of the tire having inner edges engaged with the wheel;

a deformable side wall portion of the tire connected to outer edges of each of said undeformable side wall portions;

a restricted pliable wall portion of the tire connected to outer edges of each of said deformable side wall portions;

a belt portion of the tire connected between outer edges of said restricted pliable wall portions;

a tread carrying portion of the tire connected to the outer surface of said belt portion, the tread carrying portion having side projections extending axially outwardly of said belt portion with a cavity defined between each side projection and each of said restricted pliable wall portions respectively; and a lateral restraining member connected to the wheel and extending over and in contact with each of said undeformable side wall portions for restraining the deformation thereof;

said restricted pliable wall portions resting on said side projections and closing said cavity at a load area of said tire when said tire is inflated and is under a service load at said load area.

2. A pneumatic tire and wheel construction according to claim 1, wherein said cavity is in the form of an apex and including a summit portion connected to at least one of said restricted pliable wall portions and the top of said side projections of said tread carrying portion whereby said restricted wall portion is deformed into abutment with the top of said side projections when the tire is under a service load to partially support the wheel on said tread carrying portion.

3. A pneumatic tire and wheel construction according to claim 2, further including belting means embedded in said side projections of said tread carrying portion to reinforce the tire when under a service load.

4. A tire and wheel construction according to claim 2, further including a plurality of side wall projections extending from said deformable side wall portion of the tire having cavities therebetween which enlarge when said deformable side wall portion is deformed with the tire under a load.

5. A pneumatic tire and wheel construction according to claim 2 wherein the tire sidewall portion is thinner in the area of said restricted pliable wall portion than in the area of said deformable side wall portion for enhancing an initial deformation of said restricted pliable wall portion and engagement of said restricted pliable wall portion with said side projections of said tread bearing portion when the tire is under a load.

6. A pneumatic tire and wheel construction according to claim 1, wherein said undeformable side wall portion occupies about from 10% to 25% of the total arc of said restricted pliable wall portion, said deformable side wall portion and said undeformable side wall portion.

7. A pneumatic tire and wheel construction according to claim 1, wherein said side projections of said tread bearing portion include conically bevelled top outer faces to render a cross-section of said tread bearing portion of trapezoidal shape.

8. A pneumatic tire and wheel construction according to claim 1, wherein said cavity is of apex shape and from 1 to 45 degrees in size between said side projections of said tread bearing portion and said restricted pliable wall portions.

9. A pneumatic tire and wheel construction according to claim 1 wherein said lateral restraining members are connected to said wheel and extend over and downwardly of a bead in the tire.

10. A pneumatic tire and wheel construction according to claim 1, wherein said lateral restraining members are an integral part of the wheel.

* * * * *